Patented Feb. 5, 1929.

1,701,092

UNITED STATES PATENT OFFICE.

CHARLES V. ZOUL, OF SANTA MONICA, CALIFORNIA, ASSIGNOR, BY MESNE ASSIGNMENTS, TO THE CELITE COMPANY, A CORPORATION OF DELAWARE.

PROCESS FOR DEHYDRATING OILS, FATS, ETC.

No Drawing.   Application filed March 29, 1922.  Serial No. 547,818.

This invention relates to dehydration of nonaqueous liquids such as oils, fats, varnishes and other nonaqueous liquids particularly such as are insoluble or but slightly soluble in water. My invention is of especial advantage in connection with the dehydration of oils and fats and will be particularly described as applied in such connection.

Lard, tallow or other fat as it comes from the rendering tanks, always contain much moisture in suspension, (emulsified) which moisture may consist either substantially of water or else of an aqueous solution of certain more or less water soluble content of the fat or oil. This moisture is commonly expelled by either of two methods, or a combination of such methods. One of such methods is by settling in rendering tanks, or in separate tanks but this results in very imperfect work. Another method is to heat the fat or oil to a higher temperature, say 180 to 200° F., and agitate it with air or by mechanical means. This method is efficient, but air blowing tends to oxidize the fat, while mechanical agitation of the heated fat or oil produces only a relatively slow rate of drying thereof. In any case any soluble constituents in this water are concentrated and if they are of a nature to hold water tenaciously, it is impossible to dry the fat completely by either of the above methods. Also such constituents in the water solution may be of delicate organic nature and if heated in concentrated form at elevated temperatures such as are desirable to accomplish the drying thoroughly, this organic matter may scorch or flavor the fat.

My improved process is based on the use of a solid dehydrating agent including a porous absorbent material or filter-aid, preferably diatomaceous earth preferably in dry condition and a substance having a greater dehydrating power than such absorbent material, particularly a difficultly soluble material capable of taking up water to form a substantially insoluble solid hydrate, for example, calcined gypsum. Such materials are mixed and agitated with the oil or fat to be treated and the mixture is then subjected to filtration, for example, in a pressure filter, to remove the solid dehydrating medium together with the water adsorbed or absorbed thereby. I have found that such a mixture is more effective than either of such constituents acting alone, as the diatomaceous earth aids in the filtration, as well as in the dehydration. When calcined gypsum is added to a melted fat, the mixture is difficult to filter, on account of the tendency to clog the filter cloths. When diatomaceous earth is added, the cake on the filter cloth is kept sufficiently open to prevent clogging, and at the same time advantage is taken of the dehydrating action of the diatomaceous earth in aiding the dehydrating action of the gypsum.

The total amount of the solid dehydrating agent used will depend on the amount of moisture in the oil or fat and on the character of the oil or fat, but from one to five pounds per one hundred pounds of the oil or fat will in general be sufficient. The solid dehydrating agent may consist of say ten per cent to ninety-nine per cent of diatomaceous earth, the balance being calcined gypsum.

In this process it is found that if the fat is only heated ten or twenty degrees above its melting point, it is sufficient, though this temperature need not be the limiting temperature. When the fat is melted in the mixing tank as is usually done, the calcined gypsum and diatomaceous earth are added thereto and agitated therewith. Agitation is continued during the filtration in order to keep the mixture of added substances in suspension. Filtration may be immediately started with no liability of moisture dampening the cloths and retarding the flow. A sample of such fat after dehydration and filtration will show no fog at temperatures near its solidifying point which is a good indication of the removal of the moisture. Such thorough removal of the last trace of water has the added effect of setting free from the solution in water such impurities as glue or gelatine which are better adsorbed by the diatomaceous earth thus leaving the fat purer and with better keeping qualities. This removal of the water allows such agents as fuller's earth when added for bleaching the fat, to accomplish their work more thoroughly, i. e., a dry oil or fat will require less fuller's earth to bleach to same point than one that contains traces of moisture.

This process is applicable to other nonaqueous liquids: for example, mineral oils, alcohols, ethers, ketones etc., non-miscible with water, as well as animal or vegetable oils. In carrying out that stage of the process which consists in removal of the solid dehydrating agent, together with the water taken up thereby, other methods than filtration may be used; for example, the liquid may be subjected to settling and decanting operations, or to centrifuging. This applies particularly in the case of mineral oils, alcohols, etc., which are sufficiently mobile to permit of effective separation of the solids in this manner.

The diatomaceous earth is preferably mixed with the powdered gypsum before they are added to and mixed with the oil or with liquid to be dehydrated, but, in some cases, it may be desirable to add said substances separately to the liquid, either one of them being added first. It is preferred to add the diatomaceous earth in dry condition; that is, in ordinary commercially dried condition, and in some cases it is desirable to subject the diatomaceous earth to a special drying, for example, by heating the same to 100° C. or over. In some cases it is desirable to heat the diatomaceous earth sufficiently to calcine the same.

My invention may also be carried out by bringing the liquid to be dehydrated in contact with the dehydrating agent, by causing the liquid to penetrate through a bed or layer consisting, for example, of a mixture of diatomaceous earth and calcined gypsum, in powdered form.

The gypsum used in this process is commercial calcined gypsum (plaster of Paris) approaching more or less closely to the constitution $(CaSO_4)\frac{1}{2}H_2O$. Gypsum in this state is largely dehydrated and is capable of taking up water of crystallization to form a solid hydrate.

Instead of gypsum, other dehydrating agents capable of taking up water to form a solid hydrate may be used. Examples of such materials are sodium sulphate $(Na_2SO_4)$, ammonium magnesium phosphate $(NH_4.Mg.PO_4)$, sodium tetra borate $(Na_2B_4O_7)$, sodium tetra borates partially hydrated, such as $Na_2B_4O_7.5H_2O$ and $Na_2B_4O_7.4H_2O$ and dehydrated copper sulphate $(CuSO_4)$, the latter for use in inedible fats. Further examples of such salts usable for the purpose are magnesium carbonate $MgCO_3$, calcium hypo-phosphate $(Ca_2P_2O_6)$, barium citrate $(Ba_3(C_6H_5O_7)_2)$ and sodium antimonate $(NaSbO_3)$.

It will be understood by those skilled in the art that the ratio between the amount of dehydrating agent added to the fat or oil will be preferably such that only hydration to a crystalline hydrate of the said agent occurs so that entire dissolution in water of the salt used for dehydration will not occur. In other words, the formation of a solid hydrate is aimed at. Sodium carbonate, lime, and other alkaline dehydrating agents in anhydrous condition may be used where saponification need not be feared.

The particular value of some of the more energetic dehydrating agents, such as copper sulphate, resides in their use for the dehydration of oils for electrical transformers, where the drying must be unusually thorough. The copper sulphate dehydrating agent is capable, when used in sufficient quantity, and when the contact is continued long enough, of converting 95% commercial alcohol filtered through it or otherwise thoroughly contacted with it, into absolute or nearly absolute alcohol.

In place of diatomaceous earth, other absorbent materials or filter-aids may be used, for example, tufa may be used in this process, but diatomaceous earth is preferred as being more effective. Finely divided porous carbon (ground charcoal) may also be used.

What I claim is:

1. The method of dehydrating non-aqueous liquids containing moisture, comprising bringing such liquids into contact with a dehydrating agent consisting of a mixture of an inert absorbent material and a substantially insoluble substance capable of taking up water from the liquid to form a substantially insoluble hydrate containing water of crystallization; and then separating the liquid from such dehydrating agent.

2. The method of dehydrating non-aqueous liquids containing moisture which comprises mixing such liquid with a dehydrating agent consisting of a mixture of diatomaceous earth and a substance substantially insoluble in the liquid to be dehydrated capable of combining with water to form a hydrate substantially insoluble in the liquid to be dehydrated; and then separating the liquid from such dehydrating agent and the water combined therewith.

3. The method of dehydrating non-aqueous liquids containing moisture comprising bringing such liquid into contact with a dehydrating agent consisting of a mixture of diatomaceous earth and calcined gypsum; and then separating the liquid from such dehydrating agent.

4. The method of dehydrating non-aqueous liquids containing moisture, which comprises mixing such liquid with diatomaceous earth and calcined gypsum, and then subjecting the mixture to filtration.

5. The method of dehydrating non-aqueous liquids containing moisture which consists in mixing such liquids with a dehydrating agent comprising predried diatomaceous earth and a substantially insoluble substance capable of combining with water to form a substantially insoluble hydrate; and then separating the dehydrating agent and water combined therewith from the liquid by filtration.

6. The method of dehydrating vegetable, animal, marine, and mineral oils containing moisture comprising, bringing such oil into contact with a dehydrating agent consisting of a mixture of diatomaceous earth and an insoluble substance capable of combining with water to form an insoluble hydrate; and then separating the dehydrating agent from the oil.

7. The method of dehydrating non-aqueous liquids containing moisture, which comprises bringing such liquid into contact with a dehydrating agent comprising diatomaceous earth and a substance capable of taking up water of crystallization to form a solid hydrate substantially insoluble in the liquid which is to be dehydrated, and then separating from the liquid said dehydrating agent together with combined water.

8. A method of dehydrating non-aqueous liquids containing moisture, which comprises bringing such liquid into intimate contact with an adsorbent which is commingled with a substance capable of taking up water from the liquid to be dehydrated to form a hydrate containing water of crystallization.

In testimony whereof I have hereunto subscribed my name this 16th day of March, 1922.

CHARLES V. ZOUL.